United States Patent
Claussen et al.

(10) Patent No.: US 8,489,524 B2
(45) Date of Patent: Jul. 16, 2013

(54) SYSTEMS AND METHODS FOR TURBO ON-LINE ONE-CLASS LEARNING

(75) Inventors: Heiko Claussen, Plainsboro, NJ (US); Justinian Rosca, West Windsor, NJ (US)

(73) Assignee: Siemens Corporation, Iselin, NJ (US)

( * ) Notice: Subject to any disclaimer, the term of this patent is extended or adjusted under 35 U.S.C. 154(b) by 292 days.

(21) Appl. No.: 13/084,692

(22) Filed: Apr. 12, 2011

(65) Prior Publication Data
US 2011/0302114 A1 Dec. 8, 2011

Related U.S. Application Data

(60) Provisional application No. 61/350,953, filed on Jun. 3, 2010.

(51) Int. Cl.
*G06F 15/18* (2006.01)

(52) U.S. Cl.
USPC .......................................................... 706/12

(58) Field of Classification Search
USPC .......................................................... 706/50
See application file for complete search history.

(56) References Cited

PUBLICATIONS

C. Cortes and V. Vapnik. Support-vector networks. *Machine Learning*, 20(3):273-297,1995.
H. W. Kuhn and A. W. Tucker. Nonlinear programming. In *Proceedings of the Second Berkley Symposizon on mathematical Statistics and Probability*, pp. 481-492, Berkeley, CA, 1950. University of California Press.
J. C. Platt. Fast training of support vector machines using sequential minimal optimization. *Advances in kernel methods: support vector learning*, pp. 185-208, 1999.
E. Osuna, R. Freund, and F. Girosi. An improved training algorithm for support vector machines. In *Neural Networks for Signal Processing VII—Proceedings of the 1997 IEEE Workshop*, pp. 276-285, New York, 1997. IEEE Press.
T. Joachims. Making large-scale SVM learning practical. In *Advances in Kernel Methods-Support Vector Learning*, chapter II, pp. 169-184. MIT Press, Cambridge, MA, 1999.
C. Chang and C. Lin. *LIBSVM: a library for support vector machines*, 2001. Software available at http://www.csie.ntu.edu.tw/~cjlin/libsvm/.
R. Fan, P. Chen, and C. Lin. Working set selection using second order information for training support vector machines. *Journal of Machine Learning Research*, 6: 1889-1918, 2005.
K. Crammer, J. Kandola, and Y. Singer. Online classification on a budget. In *Advances in Neural Information Processing Systems* 16, Cambridge, MA, 2004. MIT Press.
J. Kivinen, A. J. Smola, and R. C. Williamson. Online learning with kernels. *IEEE Transactions on Signal Processing*, 52(8):2165-2176, 2004.
C. Hsu, C. Chang, and C. Lin. A practical guide to support vector classification. Technical report, National Taiwan University, Department of Computer Science, 2003.
A. Frank and A. Asuncion. UCI machine learning repository, 2010, available online from http://archive.ics.uci.edu/ml/.

*Primary Examiner* — Kakali Chaki
*Assistant Examiner* — Ababacar Seck
(74) *Attorney, Agent, or Firm* — Donald B. Paschburg

(57) ABSTRACT

Methods for one-class learning using support vector machines from a plurality of data batches are provided. A first support vector machine is learned from the plurality of data batches by a processor. A new data batch is received by the processor and is classified by the first support vector machine. If a non-zero loss classification occurs a new support vector machine is trained using the first support vector machine and the new data batch only. Data batches can be discarded if they are represented by the current support vector machine or after being used for training an updated support vector machine. Weighing factors applied to update the first support vector machine depend upon a parameter which is optimized iteratively. Support vectors do not need to be recalculated. A classifier is learned in a number of stages equal to the number of data batches processed on-line.

18 Claims, 9 Drawing Sheets

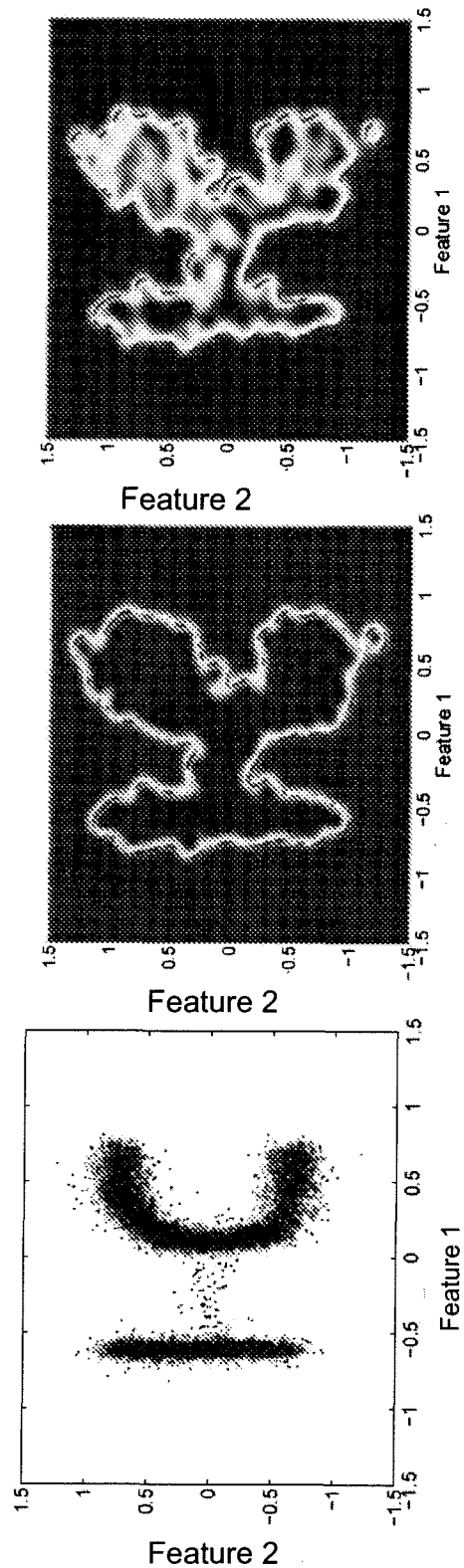

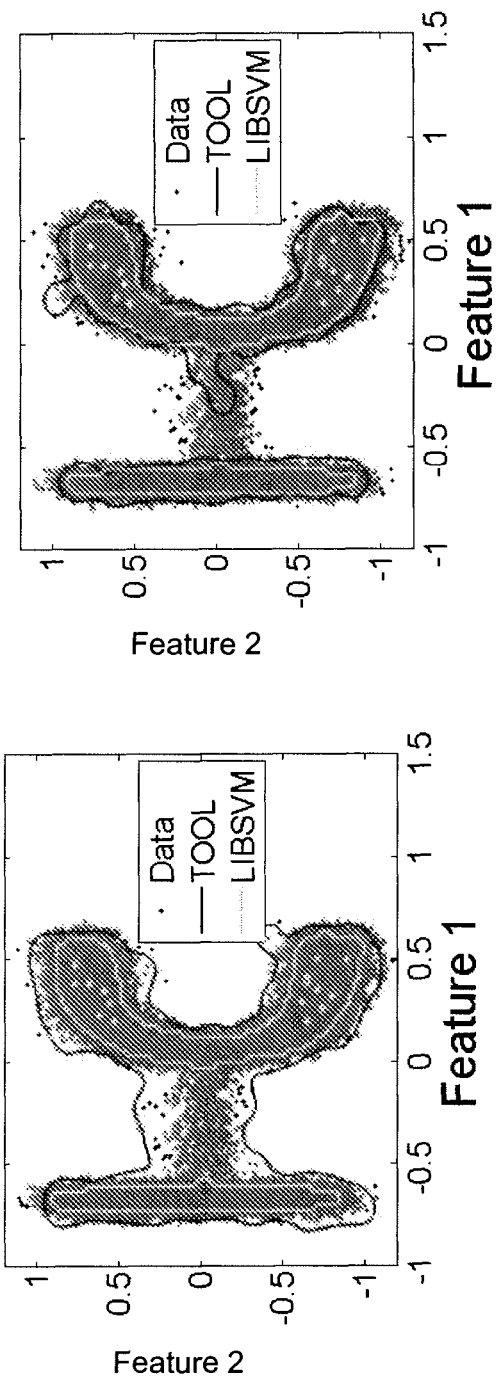
(a) Coherent data  FIG. 3a
(b) Randomized data  FIG. 3b

SYSTEMS AND METHODS FOR TURBO ON-LINE ONE-CLASS LEARNING

CROSS REFERENCE TO RELATED APPLICATIONS

The present application claims the benefit of U.S. Provisional Patent Application Ser. No. 61/350,953 filed on Jun. 3, 2010, which is incorporated by reference herein in its entirety.

BACKGROUND

The present invention relates to learning of a one-class classifier. More specifically, this invention relates to rapid on-line one-class learning.

One class learning tries to distinguish one class of objects from all possible objects by learning from a training set containing only objects of that class. Fast methods for training support vector machines (SVMs) such as applied in one-class learning problems focus almost exclusively on heuristics for bringing down the cost of large quadratic programming problems. Divide-and-conquer training approaches typically break the problem into subproblems corresponding to subsets of training data, while iterating the composition and coverage of the subproblems relative to the overall set of examples, and extend partial solutions to cover the entire data set. In this iterative process they repeatedly solve quadratic programming problems of much smaller size. Successful approaches, such as sequential minimal optimization (SMO) type learning use a large number of iterations in effect.

Current support vector machines (SVM) recalculate support vectors based on new data and old primary data, requiring the learning process to have access to old primary data and making the learning process very computing intensive. Primary data is data received by a processor from which object features can be learned.

Accordingly, novel and improved systems and methods to perform rapid on-line learning without requiring access to old primary data, are required.

SUMMARY

In accordance with an aspect of the present invention methods and systems are provided to learn on-line one-class and multi-class classifiers that apply a learned support vector machine and a current primary data batch.

Rapid methods for training support vector machines (SVMs) focus almost exclusively on heuristics for bringing down the cost of large quadratic programming problems. In contrast, aspects of the present invention embrace a true divide-and-conquer decomposition approach and focuses on a novel method, which is named turbo online one-class learning (TOOL) in at least one implementation herein, which combine solutions of subproblems for one-class classification without recomputing previously defined support vectors. A window of new primary data is looked at as a new, dependent, subproblem. This results in low dimensional quadratic programming subproblems. Overall, methods and systems provided herein are faster than state-of-the-art SVM implementations for large scale problems, generate fewer support vectors, and capture local temporal structure in the data. This makes these methods and systems suitable for complex, online learning and diagnosis tasks.

In accordance with one aspect of the present invention a method is provided to learn a classifier from a plurality of data batches, comprising inputting a first data batch into a memory connected to a processor, learning a first support vector machine from the first data batch with the processor, the processor storing the first support vector machine in the memory, inputting a new data batch into the memory, the new data batch not being represented by the first data batch and learning a new support vector machine by processing the first support vector machine and the new data batch and not the first data batch with the processor. Thus, the previously received data or batches of data are not used to learn or determine a new support vector machine in accordance with an aspect of the present invention.

In accordance with a further aspect of the present invention, a method is provided, further comprising classifying the new data batch with the first support vector machine.

In accordance with yet a further aspect of the present invention, a method is provided, wherein the new support vector machine is determined only if non-zero loss occurs in the classification of the new data batch.

In accordance with yet a further aspect of the present invention, a method is provided, wherein a class membership is determined by applying a Heaviside function $\mathcal{H}(\text{arg})$ with $\mathcal{H}(\text{arg})=1$ for $\text{arg} \geq 0$ and 0 otherwise.

In accordance with yet a further aspect of the present invention, a method is provided, wherein the Heaviside function is expressed as $\mathcal{H}(-K(.,.)+2\alpha_\mathcal{O}{}^T K(x_\mathcal{O},.)-D)$, with K being a kernel matrix, • represents data from the new data batch, $x_\mathcal{O}$ represents currently used support vectors, $\alpha_\mathcal{O}$ represents weights of currently used support vectors, $\mathcal{O}$ is a set containing learned support vectors and their respective weights, D is a bias and T indicates a transposition.

In accordance with yet a further aspect of the present invention, a method is provided, wherein the new support vector machine is determined by optimizing a function $$\hat{\alpha}_N = \underset{\alpha_N}{\operatorname{argmin}}(\lambda^2 \alpha_N^T K_{NN} \alpha_N - \lambda \alpha_N^T(\operatorname{diag}(K_{NN}) + 2\lambda K_{NO}\alpha_O - 2K_{NO}\alpha_O)),$$

wherein $\mathcal{O}$ is a set containing learned support vectors, $\mathcal{N}$ is a set containing new data, $\alpha_\mathcal{O}$ represents a weight of the currently used support vectors, $K_{\mathcal{N}\mathcal{N}}$ represents a kernel matrix of the new data, $K_{\mathcal{N}\mathcal{O}}$ represents a kernel matrix between the new data and current support vectors, $\alpha_\mathcal{N}$ represents desired weights of the new support vectors and $\gamma$ is a parameter to adjust a current and a previous weight jointly.

In accordance with yet a further aspect of the present invention, a method is provided, wherein the parameter $\gamma$ is determined iteratively by applying an expression $$\hat{\lambda} = \frac{K_{jj} - 2\alpha_O^T K_{Oj} - K_{kk} - 2\alpha_O^T k_{Ok}}{2\alpha_N^T K_{Nj} - 2\alpha_O^T K_{Oj} + 2\alpha_O^T K_{Ok} - 2\alpha_N^T K_{Nk}}$$

until an evaluated value of the parameter $\gamma$ differs no more than a predetermined value $\epsilon$ from a previously evaluated value of the parameter $\gamma$, wherein j represents an index of a support vector from the set $\mathcal{O}$ that is on a boundary of a support vector machine that is updated with the new data, and k represents an index of a support vector from the set $\mathcal{N}$ that is on a boundary of the support vector machine that is updated with the new data.

In accordance with yet a further aspect of the present invention, a method is provided, wherein the classification is performed on-line.

In accordance with yet a further aspect of the present invention, a method is provided, wherein the classification is a one-class classification.

In accordance with yet a further aspect of the present invention, the method is provided, wherein the method is applied to learn a feature extracted from a signal generated by a machine.

In accordance with another aspect of the present invention, a system is provided to learn a classifier from a plurality of data batches, comprising a memory connected to a processor to store data including instructions, the processor enabled to retrieve data from the memory and store data on the memory and enabled to execute instructions to perform the steps of inputting a first data batch into the memory, learning a first support vector machine from the first data batch, storing the first support vector machine in the memory, inputting a new data batch into the memory, the new data batch not being represented by the first data batch and learning a new support vector machine by processing the first support vector machine and the new data batch and not the first data batch with the processor.

In accordance with yet another aspect of the present invention, the processor is further enabled to perform the step classifying the new data batch with the first support vector machine.

In accordance with yet another aspect of the present invention, a system is provided, wherein the new vector machine is determined only if non-zero loss occurs in the classifying of the new data batch.

In accordance with yet another aspect of the present invention, a system is provided, wherein a class membership is determined by applying a Heaviside function $\mathcal{H}(arg)$ with $\mathcal{H}(arg)=1$ for $arg \geq 0$ and 0 otherwise.

In accordance with yet another aspect of the present invention, a system is provided, wherein the Heaviside function is expressed as $\mathcal{H}(-K(.,.)+2\alpha_\mathcal{O}{}^T K(x_\mathcal{O},.)-D)$, with K being a kernel matrix, • represents data from the new data batch, $x_\mathcal{O}$ represents currently used support vectors, $\alpha_\mathcal{O}$ represents weights of a currently used support vectors, $\mathcal{O}$ is a set containing learned support vectors and their respective weights and D is a bias.

In accordance with yet another aspect of the present invention, a system is provided, wherein the new support vector machine is evaluated by optimizing a function that depends upon $\alpha_\mathcal{O}$, $x_\mathcal{O}$, x and γ, wherein $\hat{\alpha}_\mathcal{N}$ represents weights of an extended support vector machine, $\alpha_\mathcal{O}$ represents current support vector weights, $x_\mathcal{O}$ represents current support vectors, x represents new input vectors and γ represents a parameter to adjust current and previous weights jointly.

In accordance with yet another aspect of the present invention, a system is provided, wherein the parameter γ is determined iteratively until an evaluated value of the parameter γ differs no more in value than a predetermined value ε from a previously evaluated value of the parameter γ by applying a function γ that depends on $x_\mathcal{O}$, $x_\mathcal{N}$, $\alpha_\mathcal{O}$ and $\alpha_\mathcal{N}$, wherein $x_\mathcal{O}$ represents current support vectors, $x_\mathcal{N}$ represents newly added support vectors, $\alpha_\mathcal{O}$ represents current support vector weights and $\alpha_\mathcal{N}$ represents newly added support vector weights.

In accordance with yet another aspect of the present invention, a system is provided, wherein the classification is a one-class classification.

In accordance with yet another aspect of the present invention, a system is provided, wherein the classification is a multi-class classification by modifying a constraint for determining a new vector machine from $$\sum_{i=1}^{N} \alpha_i = 1 \text{ to } \sum_{i=1}^{N} \alpha_1 = 0.$$

In accordance with yet another aspect of the present invention, a system is provided, further comprising repeating by the processor of steps until an optimum is reached.

DESCRIPTION OF THE DRAWINGS

FIGS. 2a, 2b and 2c illustrate a comparison between a method provided in accordance with an aspect of the present invention and a prior art method;

FIGS. 3a and 3b illustrate effects of applying coherent data and randomized data in accordance with an aspect of the present invention;

DESCRIPTION OF A PREFERRED EMBODIMENT

Figure 1A:
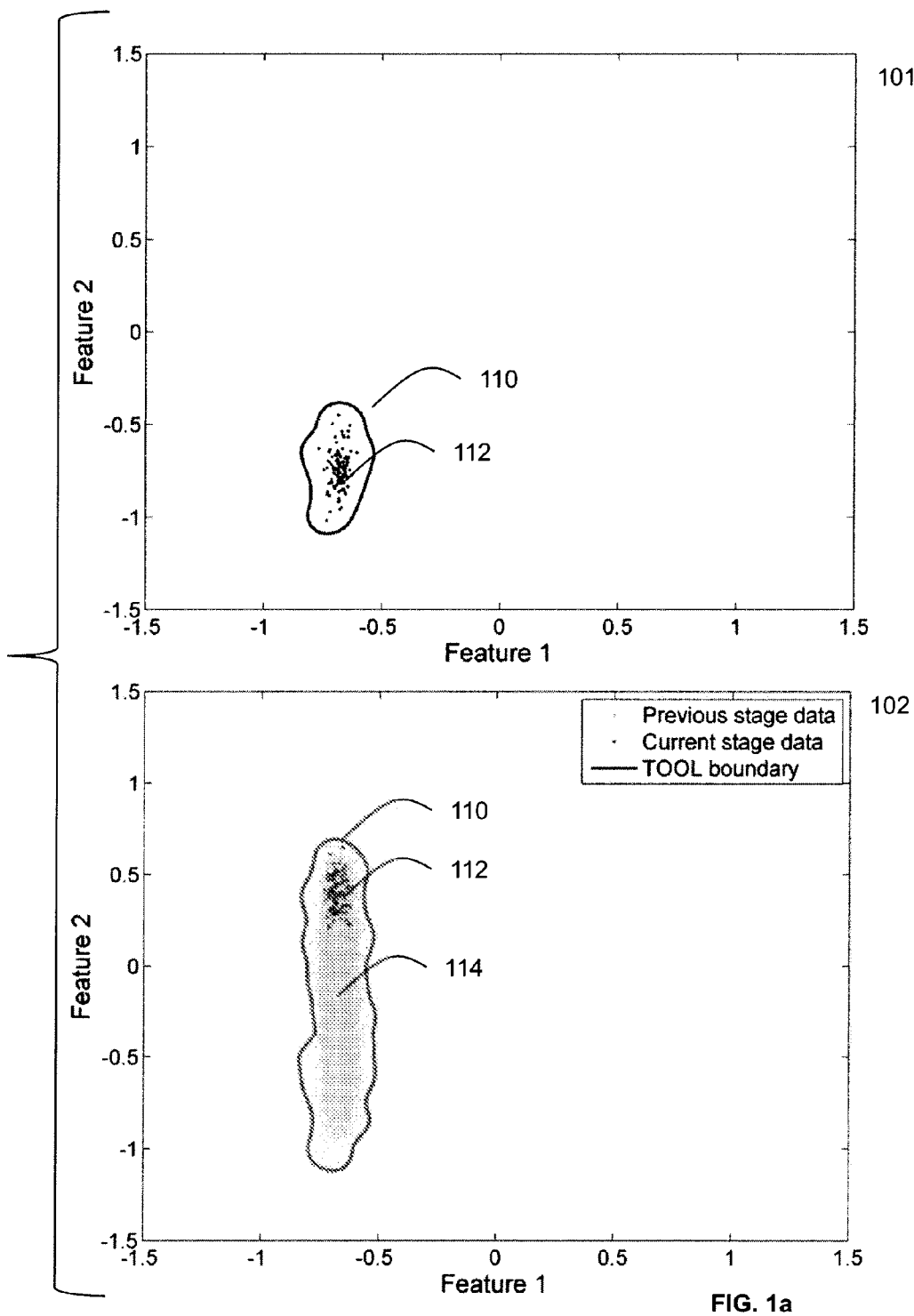
FIGS. 1a, 1b and 1c illustrate a temporal performance of an aspect of the present invention.

A true divide-and-conquer decomposition approach for on-line learning is generally provided by a novel method of the present invention, called turbo one-class on-line learning (TOOL) that combines solutions of subproblems for one-class classification, without recomputing previously defined support vectors. A window of new data would be looked at as a new, dependent subproblem. This results in low dimensional quadratic programming problem, and to construct a locally optimal solution to the extended partial problem covering the entire data seen to that point in the learning process, by combining the previous solution with the new dependent one. The new approach of the present invention is believed to be faster than state-of-the art SVM implementations, generates fewer support vectors, and captures local temporal structure in the data to make it suitable for complex, on-line learning tasks.

Systems and methods to perform turbo one-class on-line learning, that combine solutions of subproblems for one-class classification, without recomputing previously defined support vectors will be provided herein as an aspect of the present invention.

In one embodiment of the present invention methods provided in accordance with one or more aspects of the present invention are implemented in a processor run application that shall be referred to by the acronym TOOL. A referral to TOOL thus is intended to be a non-limiting illustrative example of one or more aspects of the present invention.

One motivation for developing systems and methods in accordance with an aspect of the present invention is to enable on-line diagnosis based on novelty detection and on-line learning for large scale problems, when it is unfeasible to keep around all data. For example a novelty detection system can use multi-channel sensor data at rates of one million samples per second. One-class classification is a feasible approach provided one can learn the behavior of the system in normal modes of operation over long periods of time such as one month. Out-of-normal regimes of operation are usually hard to record or model. Therefore, one requirement is to have a novelty (one-class) classification machinery and/or methods at any point in time that adapts rapidly to the current regime of operation.

State-of-the-art support vector machine (SVM) implementations are ineffective for that goal, and few provide capabilities for on-line learning at the speed and problem sizes that is aimed for herein.

Existing advanced SVM approaches strive for global optimality and therefore need to keep around all the data. One goal of an aspect of the present invention is to define a new problem decomposition approach for SVM learning that allows learning without using previous primary data and is only based on previously learned support vectors. Such a method can also be used for fast off-line SVM learning for large scale problems. One such application is to create a normal mode operation signature of a power generator as described in co-pending U.S. Provisional Patent Application Ser. No. 61/352,855 filed on Jun. 9, 2010, which is incorporated herein by reference in its entirety.

In contrast to related literature, methods that are aspects of the present invention take a true divide-and-conquer decomposition approach that combine solutions of subproblems for on-line classification. A window of new data is looked at as a new, dependent subproblem. It will be shown how this results in low dimensional quadratic programming problems, and how to construct a locally optimal solution to the extended partial problem covering the entire data seen by combining the previous solution with the new data. An on-line SVM approach will be described. Thereafter, a section shows experimental results that demonstrate the superior computational performance of TOOL for large scale problems, a lower requirement in the number of support vectors, the capability to capture temporal data structure and competitive classification results on public domain datasets.

Related Work

Support vector machines (SVMs) as described, in for instance, [1] C. Cortes and V. Vapnik, Support-vector networks, *Machine Learning*, 20(3):273-297, 1995, are useful for linear and nonlinear classification in high dimensional spaces. Here, let $X_i \in \mathbb{R}^d$ with i=1, N be one of N training data points of dimensionality d. Furthermore, let $y_i \in \{-1,1\}$, v=0, . . . , 1 and α represent the classification labels, the softness of the SVM and the weighs of the support vectors. Moreover, $K_{ij}=K(x_i, x_j)$ is an element of the symmetric positive definite kernel matrix K and $Q_{ij}=y_i K_{ij} y_j$. Training of a soft bound SVM corresponds to solving the quadratic optimization problem:

$$\operatorname*{argmin}_{\alpha} W(\alpha) = \operatorname*{argmin}_{\alpha}\left(\frac{1}{2}\alpha^T Q\alpha - \alpha^T 1\right) \quad (1)$$

$$\text{subject to: } \sum_{i=1}^{N} \alpha_i = 0 \text{ and } 0 \le \alpha_i \le \frac{1}{vN}, i=1, \ldots, N$$

The Karush-Kuhn-Tucker (KKT) conditions are necessary and sufficient for optimality as, for instance, described in [2] H. W. Kuhn and A. W. Tucker, Nonlinear programming, In *Proceedings of the Second Berkley Symposium on mathematical Statistics and Probability*, pages 481-492, Berkeley, Calif., 1950. University of California Press. However, such an optimum may be non-unique and non-isolated as described in, for instance, [3] J. C. Platt, Fast training of support vector machines using sequential minimal optimization, *Advances in kernel methods: support vector learning*, pages 185-208, 1999. That is, there may exist another optimum that requires a lower number of support vectors.

A drawback of this existing direct approach is the need to solve a very large quadratic optimization problem. Furthermore, as the size of K grows quadratically with N it is infeasible for large problems to store the matrix in memory e.g., K requires 400 megabytes for N=10000 and a precision of 4 bytes per element. It is also computationally inefficient to recompute the elements on the fly.

In the following, related work is discussed that addresses this issue and thus enables fast SVM learning. Herein the focus is on the class on-line SVM approach with the cost function Eqn. (2) that is provided below and the constraint $$\sum_{i=1}^{N} \alpha_i = 1.$$

Without an additional approach, it would face the same problem as existing approaches: which is re-using previous primary data to learn a new support vector machine. This issue will be addressed below.

An early solution to the quadratic growth of K is the 'chunking' algorithm as, for instance, described in [4] V. Vapnik, *Estimation of Dependences Based on Empirical Data: Springer Series in Statistics (Springer Series in Statistics)*, Springer-Verlag New York, Inc., Secaucus, N.J., 1982. This approach takes advantage of the fact that the solution to the quadratic problem only depends on non zero Lagrange multipliers $\alpha_i$. Therefore, only corresponding matrix elements have to be evaluated and the problem can be broken down into smaller sub-problems.

The steps of the 'chunking' approach are as follows. First, the quadratic optimization is performed on a subset of the data. Second, all remaining data are tested with the current SVM and 1 points that maximally violate the KKT conditions are identified. Third, the violating points are used with the previous support vectors as input to the quadratic optimization. This approach is iterated until convergence. Although the 'chunking' approach drastically reduces the size of K from $N^2$ to the number of support vectors squared, this may still not be sufficient for very large problems.

An alternative approach partitions the data into a fixed and a working set as described, for instance, in [5] E. Osuna, R. Freund, and F. Girosi. An improved training method for support vector machines. In *Neural Networks for Signal Processing VII-Proceedings of the 1997 IEEE Workshop*, pages 276-285, New York, 1997, IEEE Press. Therefore, not all elements of K that correspond to non zero Lagrange multipliers $\alpha_i$ are held in memory but only elements that correspond to the working set. Similarly to 'chunking', samples that violate the KKT conditions are iteratively added to the working set. The optimization converges if at least one violating example is added to the working set per iteration. Prominent methods that are based on the working set approach are SVM Light as described in [6] T. Joachims, Making large-scale SVM learning practical, In *Advances in Kernel Methods-Support Vector Learning*, chapter II, pages 169-184, MIT Press, Cambridge, Mass., 1999, sequential minimal optimization (SMO) as described in [3] J. C. Platt, Fast training of support vector machines using sequential minimal optimization, *Advances in kernel methods: support vector learning*, pages 185-208, 1999, and LIBSVM as described in [7]. C. Chang and C. Lin,

*LIBSVM: a library for support vector machines,* 2001. Software is available at URL http://www.csie.ntu.edu.tw/cjlinllibsvm; and [8] R. Fan, P. Chen, and C. Lin, Working set selection using second order information for training support vector machines, *Journal of Machine Learning Research,* 6: 1889-1918, 2005. In contrast to other methods, SMO jointly optimizes only two Lagrange multipliers per iteration. The method uses different heuristics for the selection of a good working set and needs multiple iterations over the training set for convergence. A representation of a family of related methods can be found in Method 1 as provided below. Current work improves on the selection of the working set in step 2.1 of the Method 1 as, for instance, described in [8] R. Fan, P. Chen, and C. Lin, Working set selection using second order information for training support vector machines, *Journal of Machine Learning Research,* 6: 1889-1918, 2005. The decomposition used by SMO involves working sets of size two, and thus relies on analytical solutions to small quadratic optimization problems of size two. Nonetheless, the number of iterations (step 2 in Method 1) to converge can be huge particularly for large scale problems.

---

Method 1: SMO-TYPE SVM LEARNING METHOD(X, y)

1. Initialize: $\alpha^1$ as an initial feasible solution; i = 1
2. while $\alpha^1$ is a non-optimal solution of Eqn. (1)
   2.1 Define a working set $X_N$ and let $X_O = X \backslash X_N$
   2.2 Define $\alpha_N^i$ and $\alpha_O^i$ to be sub-vectors of $\alpha^i$ for $X_N$ and $X_O$ respectively
   2.3 Find the solution $\hat{\alpha}_N$ of Eqn. (1) using X with the variable set $\alpha_N$
   2.4 Set $\alpha_N^{i+1} = \hat{\alpha}_N$, $\alpha_O^{i+1} = \alpha_O^i$ and i = i + 1
end
3. Find non-zero $\alpha_{sv}$ and respective support vectors $x_{sv}$ from $\alpha^i$ and X
4. Compute the bias D from $\alpha_{sv}$ and $x_{sv}$
Output: $x_{sv}, \alpha_{sv}, D$

---

On-line methods often employ perception-like learning approaches that are closely related to SMO as described, for instance, in [9] K. Crammer, J. Kandola, and Y. Singer, Online classification on a budget, In *Advances in Neural Information Processing Systems* 16, Cambridge, Mass., 2004, MIT Press; and [1O] J. Kivinen, A. J. Smola, and R. C. Williamson, Online learning with kernels, *IEEE Transactions on Signal Processing,* 52(8):2165-2176, 2004. However, in contrast to the previously discussed batch methods they exploit only in a limited manner the subset selection as the arrival of the data inherently predefines the current working set. In the next section, an on-line SVM is provided that makes it unnecessary to reiterate over previously found support vector weights. Therefore, this approach results in a drastic performance increase and can cope with more complex problems involving large numbers of support vectors in an on-line fashion.

Turbo One-class On-line SVM Learning in accordance with an aspect of the present invention is now described.

Should all training data $x_1, \ldots, x_N$ be available initially, the cost function of a soft-bound minimal hypersphere is given in for instance [11] J. Shawe-Taylor and N. Cristianini, *Kernel Methods for Pattern Analysis,* Cambridge University Press, New York, N.Y., 2004 on page 208 by:

$$W(\alpha) = \alpha^T K \alpha - \alpha^T \text{diag}(K) \qquad (2)$$

subject to: $\sum_{i=1}^{N} \alpha_i = 1$ and $0 \le \alpha_i \le \frac{1}{vN}, i = 1, \ldots, N$ Note that this is a generalization of a one-class SVM resulting in a hard margin for $$v = \frac{1}{N}.$$

However, it is generally assumed that data is available on-line in batch subsets $X_1, \ldots, X_i, \ldots$ with $\cup_i X_i = \{x_1, \ldots, x_N\}$. The learning procedure aims to find a one-class SVM for all data seen until step i, for all i. The herein provided strategy for fast learning, is to take advantage of the support vector machine found at step i-1 and combine it with a new support vector machine learned for the new data Xi. In the definition of an 'optimal' SVM for step i, the decomposition used in [5] E. Osuna, R. Freund, and F. Girosi, An improved training algorithm for support vector machines, In *Neural Networks for Signal Processing VII-Proceedings of the 1997 IEEE Workshop,* pages 276-285, New York, 1997, IEEE Press, [6] T. Joachims, Making large-scale SVM learning practical, In *Advances in Kernel Methods-Support Vector Learning,* chapter II, pages 169-184, MIT Press, Cambridge, Mass., 1999, [3] J. C. Platt, Fast training of support vector machines using sequential minimal optimization, *Advances in kernel methods: support vector learning,* pages 185-208, 1999 and [8] R. Fan, P. Chen, and C. Lin, Working set selection using second order information for training support vector machines, *Journal of Machine Learning Research,* 6: 1889-1918, 2005 is employed into a fixed set $\mathcal{O}$ corresponding to the SVM for step i-1, and a working set $\mathcal{N}$ for the new data:

$$\alpha = \begin{bmatrix} \alpha_N \\ \alpha_O \end{bmatrix} \text{ and } K = \begin{bmatrix} K_{NN} & K_{NO} \\ K_{ON} & K_{OO} \end{bmatrix} \qquad (3)$$

The article [5] E. Osuna, R. Freund, and F. Girosi, An improved training algorithm for support vector machines, *In Neural Networks for Signal Processing VII-Proceedings of the 1997 IEEE Workshop,* pages 276-285, New York, 1997, IEEE Press proves that this decomposition does not affect the cost function of the overall problem. An algorithm converges to the global optimum by taking different working sets and incrementally improving the overall cost function as in Method 1. However, for on-line learning, not all data are available upfront. Therefore, this prior information can only be utilized partly with increasing accuracy at convergence of the method. Using the decomposition in Eqn. (3), the cost function from Eqn. (2) can be reformulated for the on-line case as follows:

$$W(\alpha) = \alpha_N^T K_{NN} \alpha_N + \alpha_O^T K_{OO} \alpha_O + \qquad (4)$$
$$2\alpha_N^T K_{NO} \alpha_O - \alpha_N^T \text{diag}(K_{NN}) - \alpha_O^T \text{diag}(K_{OO})$$

subject to: $\sum_{i=1}^{l} \alpha_i = 1$ and $0 \le \alpha_i \le \frac{1}{vl}, i = 1, \ldots, l.$ The information about previous data is captured by the learned support vectors and their respective weights in the fixed set $\mathcal{O}$ while the new data is represented in the (new) working set $\mathcal{N}$. To it memory and computational requirements, data points that are not support vectors are discarded after each learning step. For on-line learning, this procedure can not simply be iterated by replacing $\alpha_\mathcal{O}$, with a of the previous learning step $$\sum_{i=1}^{N} \alpha_i = 1.$$

However, to enable fast computation times in complex problems, i.e., with a large number of support vectors, recomputation of previously found weights is avoided. Also, as the interdependencies of the different support vector weights model no longer available data, it is desirable to leave this prior information unchanged. Therefore, a parameter $\gamma$ is introduced to adjust the previous weights jointly. They are combined with newly found support vector weights as $\alpha=[\gamma\alpha_\mathcal{N},(1-\gamma)\alpha_\mathcal{O}]$ to address following datasets. See, for example, [10] J. Kivinen, A. J. Smola, and R. C. Williamson, Online learning with kernels. *IEEE Transactions on Signal Processing*, 52(8): 2165-2176, 2004. As the support vectors and weights of a new set are dependent on $\gamma$, the parameter is added to the cost function from Eqn. (4):

$$W(\alpha_N | \lambda) = \lambda^2 \alpha_N^T K_{NN} \alpha_N + (1-\lambda^2)\alpha_O^T K_{OO}\alpha_O + \qquad (5)$$
$$2(\lambda - \lambda^2)\alpha_N^T K_{NO}\alpha_O - \lambda\alpha_N^T \text{diag}(K_{NN}) - (1-\lambda)\alpha_O^T \text{diag}(K_{OO})$$

subject to: $\sum_{i \in \mathcal{N}} \alpha_i = 1$ and $0 \leq \alpha_i \leq \frac{1}{vl}$, $\forall i \in \mathcal{N}$ and $0 \leq \lambda \leq 1$.

To solve to this cost function, it is separated into smaller optimization problems for $\alpha$ and $\gamma$ in isolation only and iterate between them. This approach takes previous boundary conditions and support vectors into account. Also, these iterations do not require large computational effort as the fourth order problem converges rapidly and the number of elements in $\alpha_\mathcal{O}$ is generally much larger than in $\alpha_\mathcal{N}$. The optimization problem for $\alpha_\mathcal{N}$ can be found using Eqn. (5):

$$\hat{\alpha}_N = \qquad (6)$$
$$\underset{\alpha_N}{\text{argmin}}(\lambda^2 \alpha_N^T K_{NN}\alpha_N - \lambda\alpha_N^T(\text{diag}(K_{NN}) + 2\lambda K_{NO}\alpha_O - 2K_{NO}\alpha_O))$$

subject to: $\sum_{i \in \mathcal{N}} \alpha_i = 1$ and $0 \leq \alpha_i \leq \frac{1}{vl}$, $\forall i \in \mathcal{N}$.

Note that terms that exclusively depend on the set $\mathcal{O}$ are constant and thus omitted. An alternative cost function is used to find the parameter $\gamma$ and limit the dependency of previous weights on a new dataset. Else, small estimation errors lead to the eroding of previously found weights in $\alpha_\mathcal{O}$ and thus forgetting like behavior of the classifier.

The learning procedure is as follows. First, the new set of inputs at step i, $X_i$, is classified with the previously learned support vector machine. The classifier is only updated if non-zero loss occurs. At least one of the new data points lies on the updated SVM boundary if it is extended to include the new data with a minimum non-biased hypersphere. It is assumed that the boundary slowly grows as new data arrives.

Thus, the classification boundary is only partially extended by a new dataset and at least one of the old support vectors lies on the new non biased boundary. The parameter $\gamma$ is found to satisfy these conditions. The data points that are on the boundary can be identified by:

$$\hat{n} = \underset{n}{\text{argmax}}(K_{nn} - 2(1-\lambda)\alpha_O^T K_{On} - 2\lambda\alpha_N^T K_{Nn}) \qquad (7)$$

By constraining $\hat{n}\in\mathcal{N}$, the data point k=$\hat{n}$ of the new data can be found that lies on the updated boundary. Respectively, if $\hat{n}\in\mathcal{O}$, the support vector j=$\hat{n}$ is found that lies on both old and updated boundary. Note that Eqn. (7) does not require the exhaustive evaluation of all support vectors in $\mathcal{O}$ as only vectors at the boundary are considered. Also, as the identified support vector remains at the boundary, it can be used in the next iteration if it has no cross terms $\alpha_\mathcal{N}^T K_{\mathcal{N}\mathcal{O}}$ with the next dataset.

The equality of the cost function at both points on the boundary $$K_{kk} - 2(1-\gamma)\alpha_\mathcal{O}^T K_{\mathcal{O}k} - 2\gamma\alpha_\mathcal{N}^T K_{\mathcal{N}k} = K_{jj} -$$
$$2(1-\gamma)\alpha_\mathcal{O}^T K_{\mathcal{O}j} - 2\gamma\alpha_\mathcal{N}^T K_{\mathcal{N}j}$$

is employed to find $\gamma$:

$$\hat{\lambda} = \frac{K_{jj} - 2\alpha_O^T K_{Oj} - K_{kk} - 2\alpha_O^T K_{Ok}}{2\alpha_N^T K_{Nj} - 2\alpha_O^T K_{Oj} + 2\alpha_O^T K_{Ok} - 2\alpha_N^T K_{Nk}} \qquad (8)$$

The solution of Eqn. (8) is thereafter used to improve the estimate in Eqn. (6) and vice versa until convergence. A possible bias D for this on-line approach, used throughout this paper also for other algorithms, is updated for every extended set of support vectors to:

$$D = \alpha^T K\alpha - \alpha^T \text{diag}(K) \qquad (9)$$

This bias is selected for a Gaussian kernel in the center between the minimal enclosing hypersphere bias $D_{MH}=2\alpha^T K\alpha - \alpha^T \text{diag}(K)$ as described in [11] J. Shawe-Taylor and N. Cristianini. *Kernel Methods for Pattern Analysis*. Cambridge University Press, New York, N.Y., 2004 on page 199 and the minimum level $D_{MIN}=-\alpha^T \text{diag}(K)$. The class membership of new instances is indicated by the Heaviside function, $\mathcal{H}(x)=1$ for $x \geq 0$ and 0 otherwise:

$$\mathcal{H}(-K(.,.)+2\alpha_\mathcal{O}^T K(x_\mathcal{O},.)-D) \qquad (10)$$

Here, $x_\mathcal{O}$ indicates the data samples that are used as support vectors of the current on-line SVM.

The pseudocode of one illustrative implementation of a method provided in accordance with an aspect of the present invention is given in Method L and is called TOOL.

---

Method 2: TOOL(x, $x_O$, $\alpha_O$, $D_O$, l, v, $\epsilon$)

1. Initialize: $\lambda = 0.5$
2. if size ($\alpha_O$) = 0
    2.1 Compute $\alpha_N$ from x, l and v using an arbitrary SVM method
3. else
    3.1 Find misclassified data $x_{miss}$ using x, $x_O$, $\alpha_O$ and $D_O$ with Eqn. (10)

-continued

Method 2: TOOL(x, $x_O$, $\alpha_O$, $D_O$, l, v, $\epsilon$)

3.2 repeat
      3.2.1 $\lambda_{temp} = \lambda$
      3.2.2 Compute $\alpha_N$ using $x_{miss}$, $x_O$, $\alpha_O$, $\lambda$, l and v as shown in Eqn. (6)
      3.2.3 Compute $\lambda$ using $x_{miss}$, $\alpha_N$, $x_O$ and $\alpha_O$ as shown in Eqn. (7) and Eqn. (8)
      3.3 until $\lambda_{temp} - \lambda < \epsilon$
    end
5. Find non zero $\alpha_{SV}$ and respective $x_{SV}$ from $[\lambda\alpha_N, (1-\lambda)\alpha_O]$ and $[x_N, x_O]$
6. Compute D from $\alpha_{SV}$ and $x_{SV}$ as shown in Eqn. (9)
Output: $x_{SV}$, $\alpha_{SV}$, D, $\lambda$ It is pointed out that, in accordance with an aspect of the present invention, a new support vector machine is learned by processing the current support vector machine and a new data batch. Data from the preceding batches of data are not used. The current support vector machine is stored in a memory that is accessed by a processor. The processor also has access to the new data batch that, in one embodiment of the present invention, is temporarily stored in a memory that is accessed by the processor. In an embodiment of the present invention the data batch is deleted from, or overwritten in the memory after the new support vector machine has been determined. The new support vector machine is stored in the memory and is marked as such and is distinguished and distinguishable from the temporarily stored data batch. After the new support vector machine has been determined, the related data batch is or may no longer be available to the processor. Accordingly, after a new support vector machine has been determined, the related data batch is referred to as being forgotten by the processor or by a computer program that determines a support vector machine on the processor.

One goal of the present invention is to reduce learning complexity for large scale problems, with large N. Herein, the systems and methods as provided in accordance with one or more aspects of the present invention are compared against LIBSVM v2.91, one of the fastest implementations publicly available of SMO-type learning, which incorporates working set selection heuristics from [8] R. Fan, P. Chen, and C. Lin, Working set selection using second order information for training support vector machines, *Journal of Machine Learning Research*, 6: 1889-1918, 2005 (Fan reference) in step 2.1 of Method 1. The Fan reference showed that the complexity of their second order working set selection criterion is $O(N^2)$. This appears in the loop of Method 2, and is computationally unacceptable, therefore a heuristic to reduce this step to $O(N)$ was given. Still, the SMO-derived learning method suffers from slow convergence, i.e., it requires a large number of iterations to complete step 2 of Method 1. It is expected that overall complexity of LIBSVM scales up superlinearly in N. In contrast, the present invention executes a controlled number of stages, equal to the number of data batches processed on-line. In each step it combines solutions of two subproblems, the SVM from the previous step and the SVM for the most recent batch of data. The series of steps provided herein in accordance with an aspect of the present invention named TOOL spares significant computation time by reusing partial solutions entirely and not reiterating over them. The inner loop 3.2 in Method 2 as provided herein as an aspect of the present invention is executed on average a small number of times (e.g. 1-2 times). Also, the quadratic problems appearing in Eqn. (6) (step 3.2.2 in Method 2) are very small most of the time, and therefore they can be efficiently computed. It can be shown that the overall effort to process all batches of data is $O(N\bar{s})$, where $\bar{s}$ is the average number of support vectors used over all stages. The present invention will expectedly scale up linearly if the number of support vectors needed is bounded, in contrast to LIBSVM which could use $O(N)$ iterations and superlinear effort overall. Overall, the present invention uses every data point in one step only while LIBSVM potentially reevaluates data points multiple times during iterative runs through the data. One or more steps of the present invention evaluate if a set of points is represented by the current SVM. If this is the case, the present invention does not consider them anymore as potential support vectors. If they are not represented by the current SVM, the present invention selects from these points support vectors such that a minimum increase of support vectors can represent both old and new data.

A step in one definition herein is a set of instructions that is performed by a processor during a time interval after a new batch of data has been received and before the next batch of data will be received. The processor, for instance, determines at t+1 a support vector machine $SVM_{t+1}(SVM_t, DB_{t+1})$ from a directly preceding support vector machine $SVM_t$ at moment t and a data batch $DB_{t+1}$ associated with moment or time interval t+1 that follows moment t.

Steps in accordance with one or more aspects of the present invention do not globally converge to the batch solution of Eqn. (2). Below, it is shown that the solution to optimization problem in Eqn. (5) decreases the overall cost functional at every on-line stage. This shows that the solution to Eqn. (5) would converge globally if multiple steps through the data were allowed. In practice, the present invention achieves local optima close to the global optimum given by the overall batch SVM solution.

Theorem 3.1 If $\exists x_i$ s.t. $K(x_i, x_N)=0$ at every iteration, then the cost function in Eqn. (5) is monotonically decreasing for every new solution in accordance with the present invention.

The next section will describe the performance, memory requirements and properties of this on-line SVM approach which is an aspect of the present invention.

Experimental Results

One aim of the present invention is to enable rapid adaptation of its classification boundary for complex structured data which requires a large number of support vectors. An approach provided herein is compared with prominent algorithms from the literature such as LIBSVM as described in [7] C. Chang and C. Lin, LIBSVM: *a library for support vector machines*, 2001. Software is available at URLhttp://www.csie.ntu.edu.tw/cjlinllibsvm. See also [8] R. Fan, P. Chen, and C. Lin, Working set selection using second order information for training support vector machines, *Journal of Machine Learning Research*, 6: 1889-1918, 2005 and SVM Light as described in T. Joachi s, Making large-scale SVM learning practical, In *Advances in Kernel Methods-Support Vector Learning*, chapter II, pages 169-184, MIT Press, Cambridge, Mass., 1999. Experiments were performed on the public domain datasets SVM guide as provided in [12] C. Hsu, C. Chang, and C. Lin, A practical guide to support vector classification, Technical report, National Taiwan University, Department of Computer Science, 2003 and in [13] A. Frank and A. Asuncion, UCI machine learning repository, 2010, to demonstrate comparable classification results, and large artificial datasets to illustrate the specific properties of the present invention. Only one class of the training data for the evaluation of the present one-class approach was used. That is, the 4 attributes of class I of SVM guide were used with 1089 points and 9 attributes of class I of shuttle with 34108 points for training. The performance of the methods is given in Table 1 by their processing time, number of support vectors, training loss and their false acceptance (FA) and false rejection (FR) rate with the test data. All compared approaches are used with the same Gaussian kernel and non-optimized settings. Note that the batch size of 100 is a constraint on the maximum working set of the present invention and SVM Light that does not affect the order of training samples for LIBSVM or SVM Light. The presented results demonstrate comparable classification performance of the present invention to other methods.

In one embodiment of the present invention, a system for one class learning as provided herein, processes a plurality of data batches that jointly include at least one million signal samples. In another embodiment of the present invention a system for one class learning as provided herein processes a plurality of data batches that jointly include less than one million signal samples.

Henceforth, one embodiment of the present invention shall also be referred to as TOOL.

TABLE 1

Classification results on public datasets

| Dataset & Settings | Method | Time [s] | SVs [#] | Loss [#] | FR [%] | FA [%] |
|---|---|---|---|---|---|---|
| SVM guide ($v = 1/N$, $var_K = 0.01$) | TOOL | 0.39 | 183 | 1/218 | 4.8 | 14.9 |
|  | LIBSVM | 0.05 | 264 | 0 | 2.2 | 17.7 |
|  | SVM Light | 0.49 | 307 | 0 | 2.0 | 17.7 |
| Shuttle ($v = 1/N$, $var_K = 0.0001$) | TOOL | 220.50 | 1144 | 1 | 0.37 | 0.07 |
|  | LIBSVM | 12.43 | 1035 | 0 | 0.37 | 0.1 |
|  | SVM Light | 623.41 | 2918 | 0 | 0.26 | 0.17 |

Figure 1B:
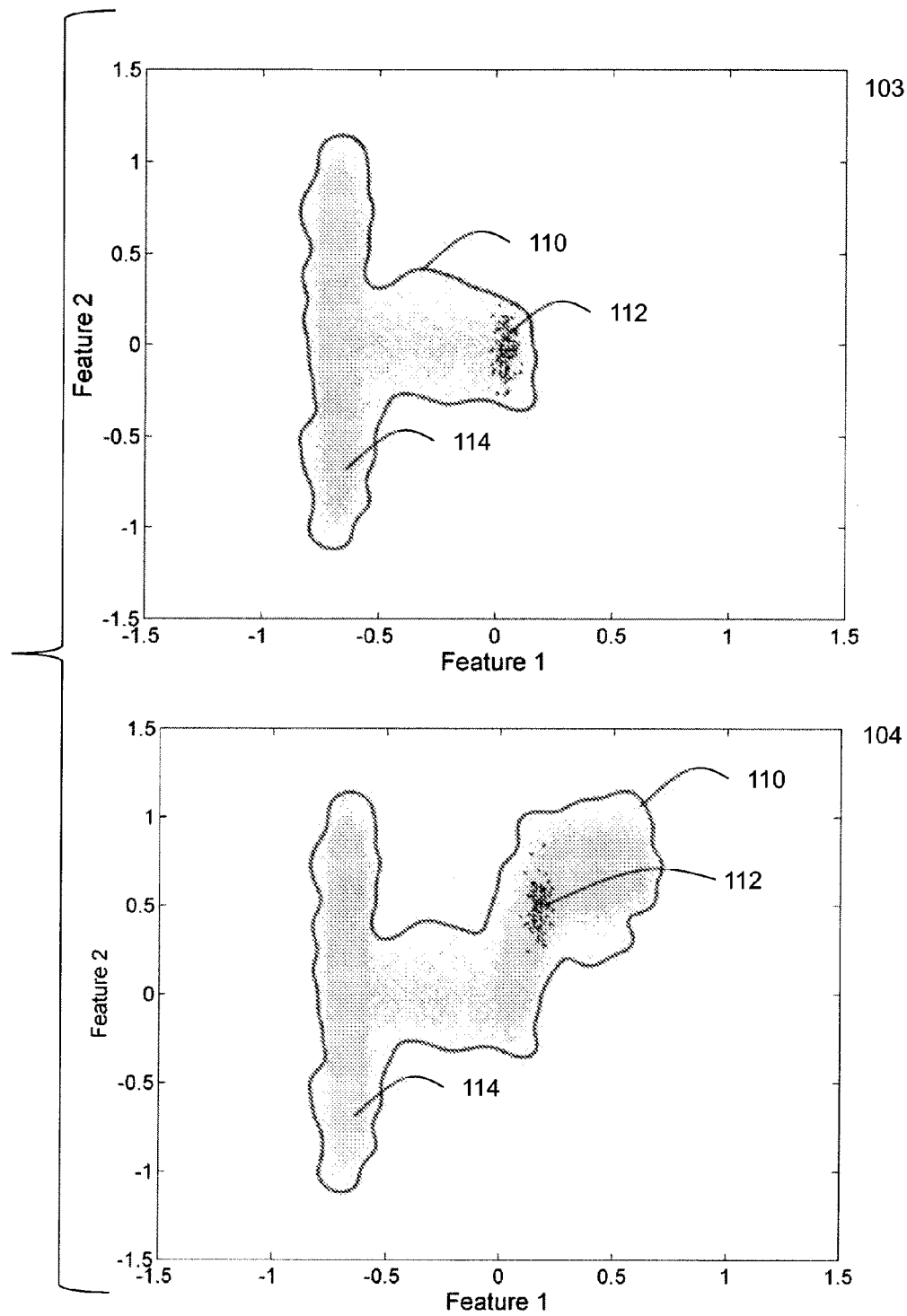
Figure 1C:
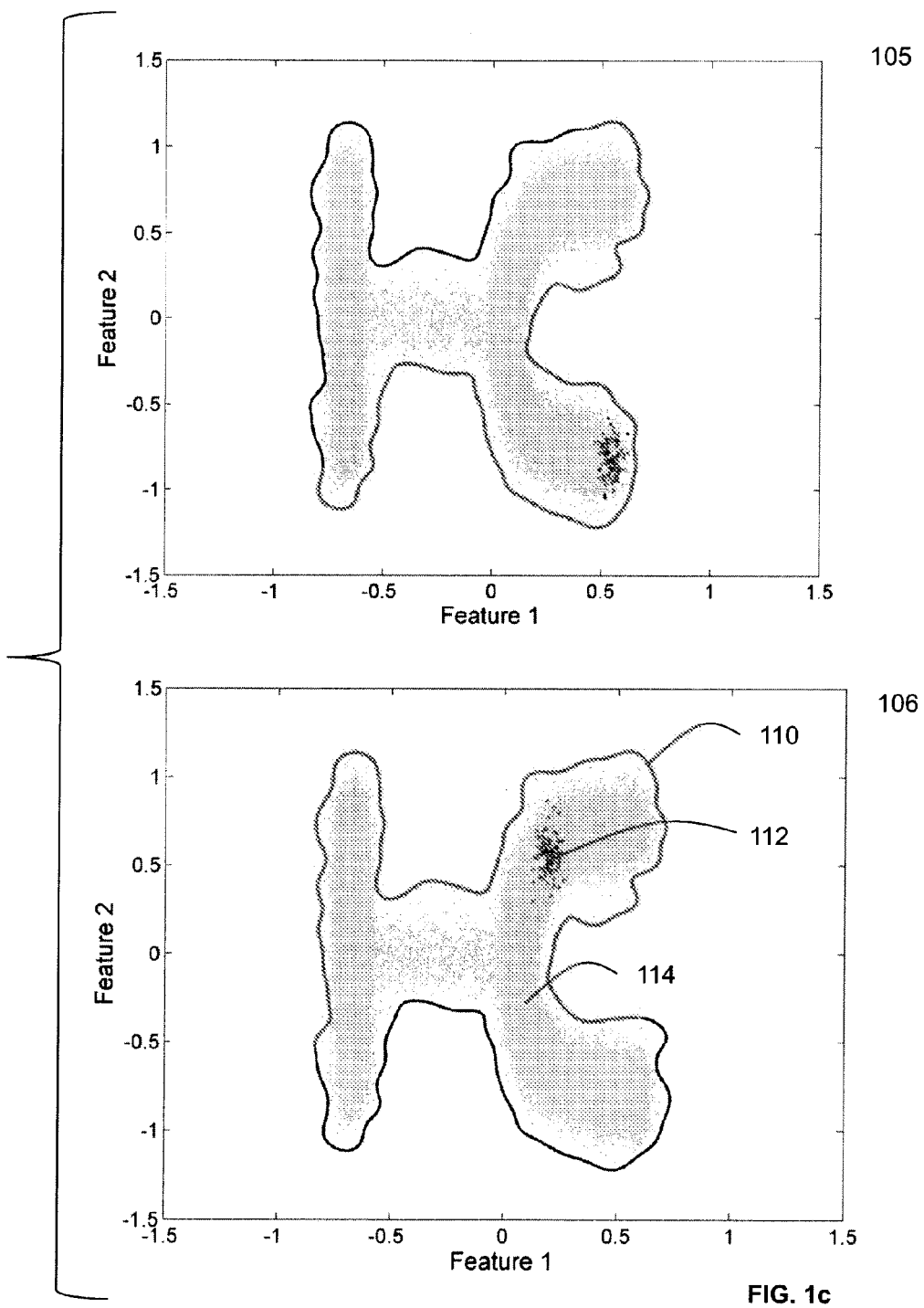

The artificial data is modeled according to observed structure from real diagnostic data in the field. That is, as a multivariate Gaussian distribution that slowly moves in defined states or transients between them and is exposed to sporadic noise. Two dimensional training sets were generated of 10000, 100000 and 1000000 points to show how different approaches scale with the number of input samples. FIGS. 1a, 1b and 1c in graphs 101, 102, 103, 104, 105 and 106 show the temporal structure of the 100000 points training set and the strictly expanding boundary of the hard margin in accordance with the present invention. In graph 101, an a state vector machine defining boundaries 110 is determined from data 112. In graph 102, previous data 114 has been used to expand the boundary defined by a recalculated state vector machine (not shown) and new data 112 has been used to calculate a new state vector machine without using the old data 114, and a new boundary 110 has been established. This process repeats itself in graphs 103, 104, 105 and 106 until the process converges. The number of support vectors grew as follows: 13, 46, 112, 181, 243 and 251. FIG. 1 illustrates a temporal structure of the 100000 points artificially generated data and the current on-line learned hard margin boundary in accordance with the TOOL approach of the present invention. The discarded data from previous stages is given in gray, the current stage data in blue and the current boundary of TOOL in green. The TOOL boundary, in accordance with the present invention, is unaffected in regions of previous stages that are not revisited by new data. This is because the old data is not used to determine the new support vector machine.

FIG. 2a exemplifies the used training set for 10000 points. Next, it is demonstrated how the processing time and number of support vectors scale in accordance with TOOL, LIBSVM and SVM Light with increasing number of training points. Thus, the training sets are randomly permuted 500 times and learned hard margin classifiers with Gaussian kernel of variance 0.005. TOOL, in accordance with an aspect of the present invention is presented with successive subsets of 100 samples.

Both, LIBSVM and SVM Light are presented with all data instantaneously and SVM Light is constrained to maximal quadratic programming problems of size 100. The cost functions of one instance of this experiment are illustrated in FIG. 2b and FIG. 2c for LIBSVM and the TOOL respectively. The cost function of SVM Light is omitted due to its similarity with LIBSVM. The classification boundary is given as a black line. In FIG. 2c the cost function of the TOOL has a higher variance for in-class data points than LIBSVM in FIG. 2b.

LIBSVM and SVM Light iterate multiple times over the data and update weights of previously found support vectors to find a globally optimal classifier. In contrast, the TOOL evaluates the support vector weights only once per input batch and thereafter joins these locally optimal classifiers. This results in an increased variance in the cost of the support vectors, and gene ally points inside the classification boundary, as illustrated in FIG. 2c. The variance inside the classification boundary can result in a small loss as illustrated in Table 2. This effect can be reduced by the alternative bias choice $D_A = -1 + 2\min(K)$ which results in the minimal hypersphere boundary. The drawback of this approach is an increased processing time and number of support vectors.

An advantage of the single pass approach TOOL is the low processing time shown in following Table 2.

TABLE 2

Performance comparison of hard margin SVM classifiers

| Training Size | Method | Processing Time [s] | Support Vectors [#] | Loss |
|---|---|---|---|---|
| 10000 | TOOL (D) | 1.07 ± 0.07 | 150.51 ± 6.98 | 1/18519 |
|  | TOOL ($D_A$) | 8.10 ± 0.85 | 326.97 ± 11.46 | 1/5000000 |
|  | LIBSVM | 0.54 ± 0.02 | 251.83 ± 6.98 | 0 |
|  | SVM Light | 30.91 ± 1.25 | 973.07 ± 37.64 | 0 |
| 100000 | TOOL (D) | 6.54 ± 0.26 | 162.68 ± 5.49 | 1/185185 |
|  | LIBSVM | 6.06 ± 0.39 | 277.42 ± 7.74 | 0 |
|  | SVM Light | 1602.74 | 2402 | 0 |
| 1000000 | TOOL (D) | 95.03 | 220 | 0 |
|  | LIBSVM | 135.59 | 333 | 0 |

The advantages are particularly visible for large data sets and Table 2 demonstrates that TOOL scales better with the number of instances N than the other approaches. Note that both LIBSVM and SVM Light are optimized implementations in C while TOOL is implemented in Matlab. Thus, similar optimizations can further increase the processing time of TOOL. Additionally, Table 2 illustrates that TOOL uses a reduced number of support vectors. This leads to lower memory requirements and more importantly a reduction in testing time for new input data. Moreover, the variances of both processing time and number of support vectors are lower for the TOOL than for SVM Light. This higher certainty on the number of support vectors and processing time is especially important for cases where data and predictions are expected at a constant rate. Thus, the presented aspects of the present invention enable to address higher input data rates and larger, more complex structured problems.

A further advantage of the present invention is that local data structure is retained while its soft margin allows robustness against outliers. For example, diagnostic data generally contains many feature points at certain states and few points describing transitions and noise induced outliers. A global soft margin SVM approach can cancel noise but possibly also data that captures transitional effects. By enforcing a time localized soft margin, the aspects of the present invention can capture this local structure while disregarding outliers. This effect of the temporal data structure on the classification boundary is illustrated in FIGS. 3a and 3b. Comparison of an implementation of aspects of the present invention in a processor based application which is referred to herein as TOOL and LIBSVM run with soft margin (v=0.1) on data of size 10000 in temporal coherent order in FIG. 3a and its randomized version in FIG. 3b. FIG. 3a shows that TOOL captures the transition region (horizontal from left to right) while LIBSVM does not. FIG. 3b shows that Data does not have coherence. Therefore, the methods treat the transition region as outliers and capture the regions of highest data density.

Figure 4:
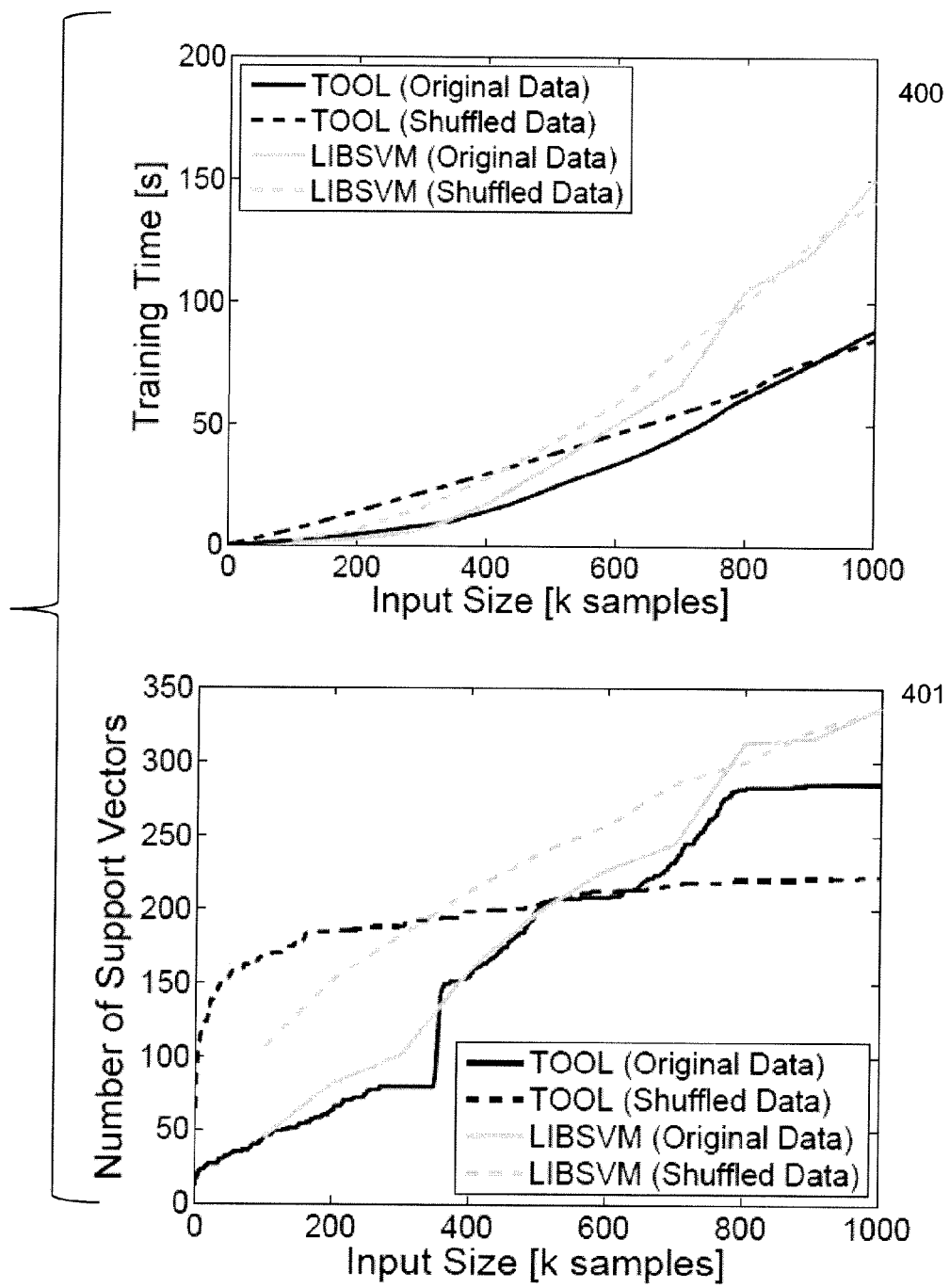
FIG. 4 illustrates a performance comparison between methods provided in accordance with an aspect of the present invention and with existing methods.

FIG. 4 illustrates graphically in graphs 400 and 401 the difference between the herein provided TOOL methods and the known LIBSVM methods.

One goal was to address large scale online SVM learning problems. The provided TOOL treats the learning problem as an online, incremental procedure on new batches of data. It reuses the support vector weights from previous learning stages to construct the classifier of the current stage rather than involve costly iteration steps used in current algorithms. In practice TOOL reaches local optima close to the global optimum given by the overall batch SVM solution. For large scale problems, the TOOL approach scales better than SMO type algorithms. In the soft margin version, TOOL can use temporal coherence in the data to distinguish transitional regions from outliers. Although TOOL has been presented as an implementation of a method for one-class classification in accordance with an aspect of the present invention, it could also be employed for multi-class problems. Methods and systems provided herein, as an aspect of the present invention, can also be applied for fast learning of off-line problems, and also for multi-class problems.

In accordance with an aspect of the present invention, the approach to one-class learning provided herein is adapted to a multi-class learning approach by applying the constraint $$\sum_{i=1}^{N} \alpha_i = 0$$

instead of the earlier provided constraint $$\sum_{i=1}^{N} \alpha_i = 1.$$

Questions regarding processing speed vs. batch size and on-line, off-line and real-time learning can be understood from the scenarios provided herein. That is, the TOOL receives data packages (or so called data batches) on-line and in real-time. Due to the large amount of data, a memory for an SVM application such as TOOL cannot store all previous data. Therefore, TOOL improves a classifier step by step while new data arrives. At every step, TOOL has to solve a problem that scales nonlinearly with the batch size. Therefore it is advantageous to keep the batch size small. This is the reason why an SVM application such as SMO only optimizes 2 input samples at a given time. On the other hand TOOL performs the combination of old with new support vectors more often if the batch size is small. Therefore, there exists a batch size (which is relatively small) that is optimal regarding processing speed. However, this varies dependent on the number of old support vectors and speed of change in the new data. Most other SVM methods assume the off-line case. That is, a processor has all data accessible in a database and processes it to extract a SVM classifier. Methods like LIBSVM iterate multiple times over the data to find an 'optimal' classifier. The distinction between on-line and off-line describes the availability of the data. That is if one can go back to previously seen data (off-line) or not (on-line). In contrast, real-time means that one has to solve a certain problem as fast as it is needed in a real application. (Note that an off-line algorithm like LIBSVM could be real-time if there is not a continues stream of data but distinct problems to solve) A data batch is a subset of the overall data that a SVM algorithm focuses on at a certain iteration of the algorithm. E.g. on-line algorithms would pick data batches as follows: pick points 1-100, process, pick points 101-200, process etc. Off-line algorithms could pick data batches as follows: pick 100 points randomly, process, pick 100 points randomly, process etc., or they have certain fast selection criterion.

Figure 5:
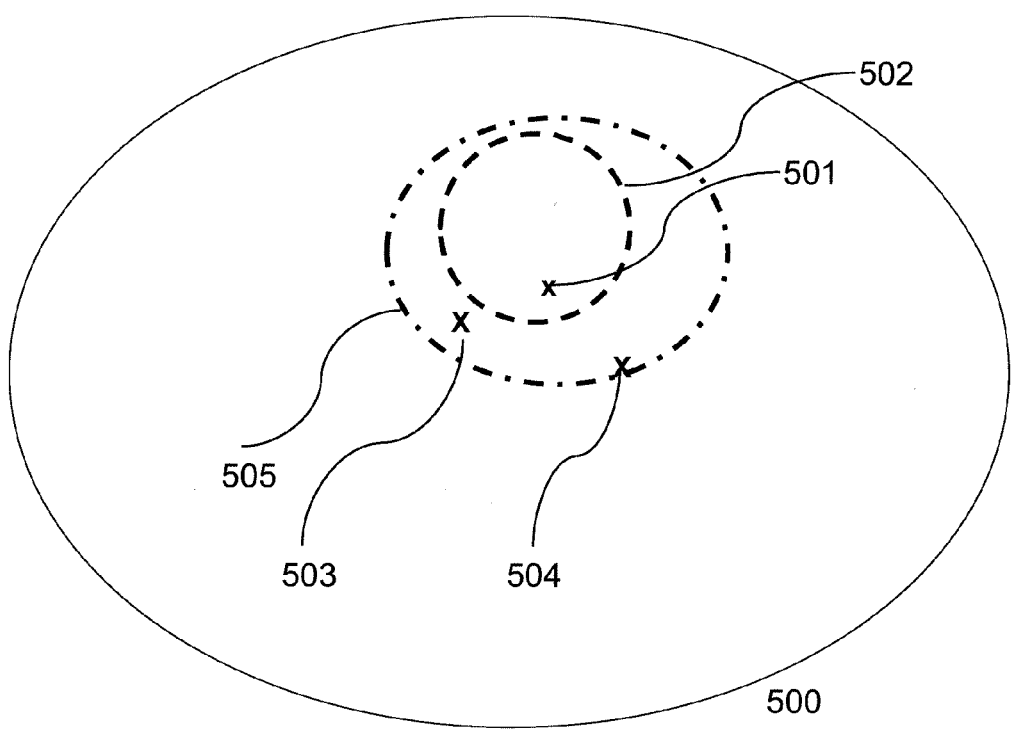
FIG. 5 illustrates a one-class learning process in accordance with an aspect of the present invention.

The one-class learning process in accordance with an aspect of the present invention is illustrated in FIG. 5. Data defining a class from a set 500 is received by a processor to be processed to learn a certain class. In accordance with one aspect of the present invention, only data defining the class is processed. For instance a first batch of data, including data point 501 is processed to determine a state vector machine that defines a first boundary 502 of the class. A second batch of data, including datapoints 503 and 504 are input by a processor and processed. The datapoints 503 and 504 lie outside boundary 502. Based on one or more weight factors or other decision criteria these points may be considered to be outliers and nothing changes (i.e. no new state vector machine is determined) or they can necessitate the determination of a new state vector machine that re-define a new boundary of the class. The old data is not used to determine the new state vector machine and, instead, the new datapoints, including points 503 and 504 are used to determine the new state vector machine from which a new boundary 505 is determined. Thus, the datapoints 503 and 504 lie now inside the newly learned boundary 505. The term boundary can be replaced by "new rule" or "new Support Vector Machine." After being processed to determine a boundary or SVM, the datapoints are "forgotten" and are not retained in accordance with one aspect of the present invention. A boundary will be retained, allowing the determination of a new boundary, based on a previous boundary and new datapoints or primary data. In accordance with an aspect of the present invention, the boundary converges to a stable SVM that does not change significantly with new data. Assume a space $\mathcal{S}$ of all possible data points and a set $\mathcal{O} \subset \mathcal{S}$ that is included in the current SVM boundary. If there arrives a new set of data $\mathcal{N} \subset \mathcal{S}$ with $\mathcal{N} \subset \mathcal{O}$ the SVM boundary is not extended. However if the number of elements in $\mathcal{N} \setminus \mathcal{O}$ is above a defined maximum loss, the SVM boundary is extended to include all of $\mathcal{O} \cup \mathcal{N}$ given $$v = \frac{1}{l}.$$

In one embodiment of the present invention, a system and/or method as provided herein, is applied to learn features from signals generated by a machine. Such a machine may be a mechanical machine, including but not limited to power generating machinery or powered machinery. Such a machine may also be an electrical machine that generates signals, such as telecommunication equipment or imaging equipment. Such a machine may also be a control system, including process control or traffic control equipment. Such a machine may also be any other signal generating machine or a sensor that generates signals which can be used to extract and/or learn a feature in a one-class or multi-class manner with a support vector machine.

Figure 6:
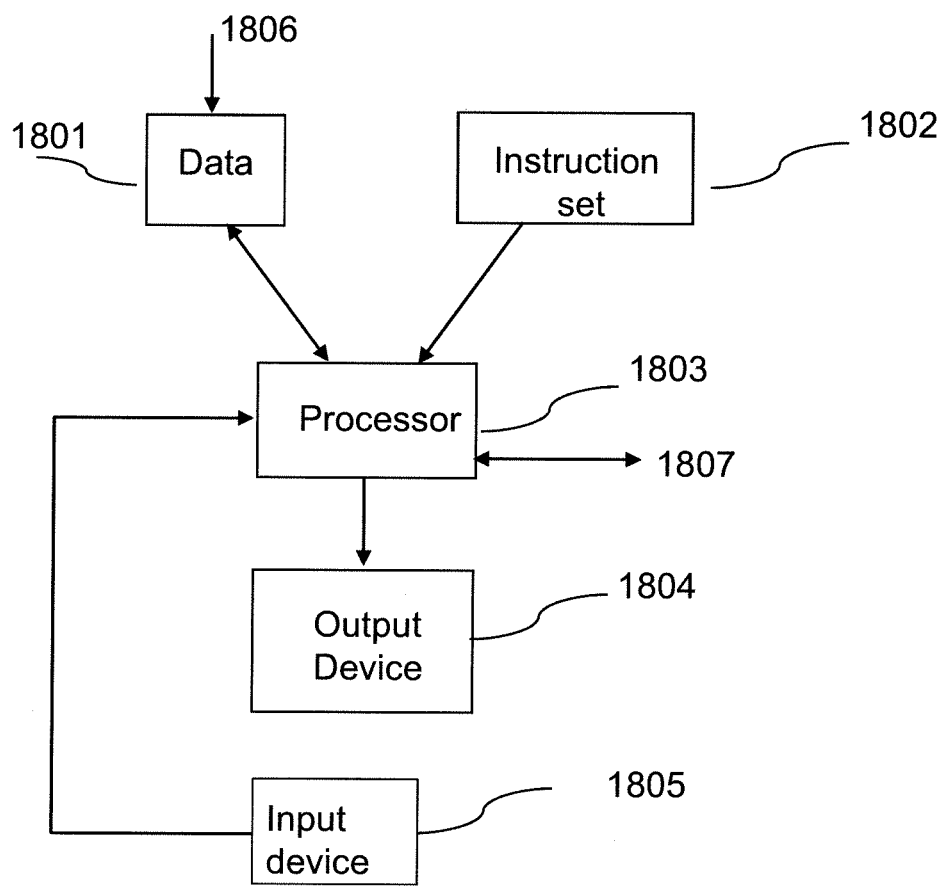
FIG. 6 illustrates a system in accordance with an aspect of the present invention.

The methods as provided herein are, in one embodiment of the present invention, implemented on a system or a computer device. A system illustrated in FIG. 6 and as provided herein is enabled for receiving, processing and generating data. The system is provided with data that can be stored on a memory 1801. Data may be obtained from a sensor or may be provided from a data source. Data may be provided on an input 1806. The processor is also provided or programmed with an instruction set or program executing the methods of the present invention is stored on a memory 1802 and is provided to the processor 1803, which executes the instructions of 1802 to process the data from 1801. Data, such as a classification or any other signal resulting from the processor can be outputted on an output device 1804, which may be a display to display data or a loudspeaker to provide an acoustic signal. The processor also has a communication channel 1807 to receive external data from a communication device and to transmit data to an external device. The system in one embodiment of the present invention has an input device 1805, which may be a keyboard, a mouse or any other device that can generated data to be provided to processor 1803. The processor can be dedicated hardware. However, the processor can also be a CPU or any other computing device that can execute the instructions of 1802. Accordingly, the system as illustrated in FIG. 6 provides a system for data processing resulting from a sensor or any other data source and is enabled to execute the steps of the methods as provided herein as an aspect of the present invention.

Thus, a system and methods have been described herein for Turbo One-class On-line Training. The methods described herein can also be applied to off-line learning. The methods described herein can also be applied to multi-class learning.

Figure 7:
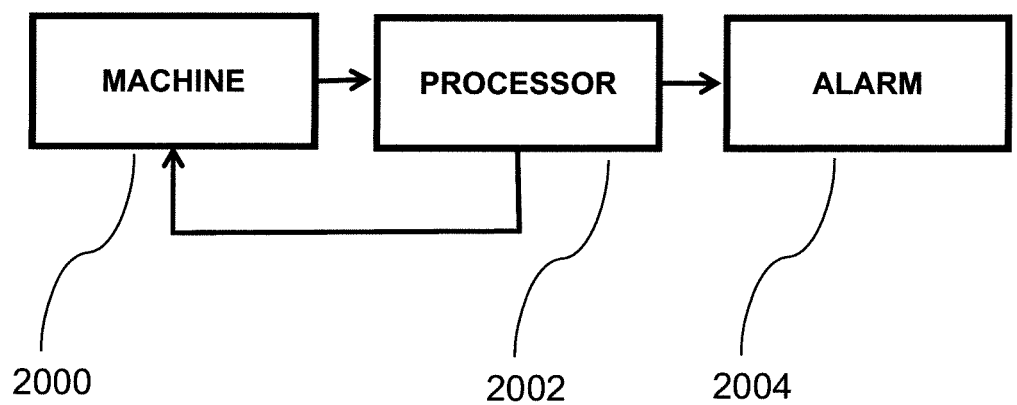
FIG. 7 illustrates another system in accordance with another aspect of the present invention.

Once the learning process has been completed in the manner just described, an operationally acceptable state vector machine is determined. Referring to FIG. 7, a machine 2000 which is operating is monitored by a processor 2002. The processor 2002 receives operational data from the machine 2000. The processor 2002 compares the received operational data to the boundaries of the state vector machine previously determined in the manner described earlier. If the operational data falls outside the established boundaries, then the processor 2002 causes an alarm 2004 to be set. This step advises whether maintenance or other activity must be taken. If the operational data is within the boundaries established by the previously determined state vector machine, then the processor 2002 indicates on the alarm 2004 that no action need be taken. The processor 2002 continues to monitor the machine 2000 in this manner. Thus, a state vector machine is determined in a learning mode and then a machine is monitored using the state vector machine in an operational/monitoring mode.

The following references provide background information generally related to the present invention and are hereby incorporated by reference: [1] C. Cortes and V. Vapnik. Support-vector networks, *Machine Learning,* 20(3):273-297, 1995; [2] H. W. Kuhn and A. W. Tucker, Nonlinear programming, In *Proceedings of the Second Berkley Symposium on mathematical Statistics and Probability*, pages 481-492, Berkeley, Calif., 1950, University of California Press; [3] J. C. Platt, Fast training of support vector machines using sequential minimal optimization, *Advances in kernel methods: support vector learning*, pages 185-208, 1999; [4] V. Vapnik, *Estimation of Dependences Based on Empirical Data: Springer Series in Statistics (Springer Series in Statistics)*, Springer-Verlag New York, Inc., Secaucus, N.J., 1982; [5] E. Osuna, R. Freund, and F. Girosi, An improved training algorithm for support vector machines, In Neural *Networks for Signal Processing VII-Proceedings of the* 1997 *IEEE Workshop*, pages 276-285, New York, 1997, IEEE Press; [6] T. Joachi s Making large-scale SVM learning practical, In *Advances in Kernel Methods-Support Vector Learning*, chapter II, pages 169-184. MIT Press, Cambridge, Mass., 1999; [7] C. Chang and C. Lin, *LIBSVM: a library for support vector machines*, 2001 (Software available at URLhttp://www.csie.ntu.edu.tw/cjlinllibsvm); [8] R. Fan, P. Chen, and C. Lin, Working set selection using second order information for training support vector machines, *Journal of Machine Learning Research*, 6: 1889-1918, 2005; [9] K. Crammer, J. Kandola, and Y. Singer, Online classification on a budget, In *Advances in Neural Information Processing Systems* 16, Cambridge, Mass., 2004. MIT Press; [10] J. Kivinen, A. J. Smola, and R. C. Williamson, Online learning with kernels, *IEEE Transactions on Signal Processing*, 52(8):2165-2176, 2004; [11] J. Shawe-Taylor and N. Cristianini, *Kernel Methods for Pattern Analysis*, Cambridge University Press, New York, N.Y., 2004; [12] C. Hsu, C. Chang, and C. Lin, A practical guide to support vector classification, Technical report, National Taiwan University, Department of Computer Science, 2003; and [13] A. Frank and A. Asuncion, UCI machine learning repository, 2010.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims.

The invention claimed is:

1. A method to learn a classifier from a plurality of data batches, comprising:
   inputting a first data batch into a memory connected to a processor;
   learning a first support vector machine from the first data batch with the processor;
   the processor storing the first support vector machine in the memory;
   inputting a new data batch into the memory, the new data batch not being represented by the first data batch; and
   learning a new support vector machine by processing the first support vector machine and the new data batch and not the first data batch with the processor, including determining the new support vector machine by optimizing a function $$\hat{\alpha}_N = \underset{\alpha_N}{\operatorname{argmin}} (\lambda^2 \alpha_N^T K_{NN} \alpha_N - \lambda \alpha_N^T (\operatorname{diag}(K_{NN}) + 2\lambda K_{NO}\alpha_O - 2K_{NO}\alpha_O)),$$

wherein O is a set containing learned support vectors,
   N is a set containing the new batch data,
   $\alpha_O$ represents a weight of support vectors from the first support vector machine, $K_{NN}$ represents a kernel matrix of the new batch data, $K_{NO}$ represents a kernel matrix between the new batch data and support vectors from the first support vector machine, $\alpha_N$ represents desired weights of support vectors from the new support vector machine, and λ is a parameter to adjust weights from the first support vector machine and from the new support vector machine jointly.

2. The method of claim 1, further comprising:
classifying the new data batch with the first support vector machine.

3. The method of claim 2, wherein the new support vector machine is determined only if non-zero loss occurs in the classification of the new data batch.

4. The method of claim 2, wherein a class membership is determined by applying a
Heaviside function H(arg) with H(arg)=1 for arg>0 and 0 otherwise.

5. The method of claim 4, wherein the Heaviside function is expressed as $H(-K(\cdot,\cdot) + 2\alpha_O^T K(x_o, \cdot) - D)$, with K being a kernel matrix, • represents data from the new data batch, $x_O$ represents currently used support vectors, $\alpha_O$ represents weights of currently used support vectors, O is a set containing learned support vectors and their respective weights, D is a bias and T indicates a transposition.

6. The method of claim 1, wherein the parameter λ is determined iteratively by applying an expression $$\hat{\lambda} = \frac{K_{jj} - 2\alpha_O^T K_{Oj} - K_{kk} - 2\alpha_O^T K_{Ok}}{2\alpha_N^T K_{Nj} - 2\alpha_O^T K_{Oj} + 2\alpha_O^T K_{Ok} - 2\alpha_N^T K_{Nk}}$$

until an evaluated value of the parameter λ differs no more than a predetermined value ∈ from a previously evaluated value of the parameter λ, wherein j represents an index of a support vector from the set O that is on a boundary of a support vector machine that is updated with the new data batch, and k represents an index of a support vector from the set N that is on a boundary of the support vector machine that is updated with the new data batch.

7. The method of claim 1, wherein the classification is performed on-line.

8. The method of claim 1, wherein the classification is a one-class classification.

9. The method of claim 1, wherein the method is applied to learn a feature extracted from a signal generated by a machine.

10. A system to learn a classifier from a plurality of data batches, comprising:
a memory connected to a processor to store data including instructions;
the processor enabled to retrieve data from the memory and store data on the memory and enabled to execute instructions to perform the steps of:
inputting a first data batch into the memory;
learning a first support vector machine from the first data batch;
storing the first support vector machine in the memory;
inputting a new data batch into the memory, the new data batch not being represented by the first data batch; and
learning a new support vector machine by processing the first support vector machine and the new data batch and not the first data batch with the processor, and by optimizing a function $\hat{\alpha}_N$ that depends upon $\alpha_O$, $x_O$, x and λ, wherein $\hat{\alpha}_N$ represents weights of the new support vector machine, $\alpha_O$ represents support vector weights used in the first support vector machine, $x_O$ represents support vectors in the first support vector machine, x represents support vectors in the new support vector machine and λ represents a parameter to adjust support vector weights in the first support vector machine and support vector weights in the new support vector machine jointly.

11. The system of claim 10, the processor further enabled to perform the step:
classifying the new data batch with the first support vector machine.

12. The system of claim 11, wherein the new vector machine is determined only if non-zero loss occurs in the classifying of the new data batch.

13. The system of claim 11, wherein a class membership is determined by applying a Heaviside function H(arg) with H(arg)=1 for arg>0 and 0 otherwise.

14. The system of claim 13, wherein the Heaviside function is expressed as $H(-K(\cdot,\cdot) + 2\alpha_O^T K(x_o, \cdot) - D)$, with K being a kernel matrix, • represents data from the new data batch, $x_O$ represents currently used support vectors, $\alpha_O$ represents weights of a currently used support vectors, O is a set containing learned support vectors and their respective weights and D is a bias.

15. The system of claim 10, wherein the parameter λ is determined iteratively until an evaluated value of the parameter λ differs no more in value than a predetermined value ∈ from a previously evaluated value of the parameter λ by applying a function $\hat{\lambda}$ that depends on $x_O$, $x_N$, $\alpha_O$ and $\alpha_N$, wherein $x_O$ represents current support vectors used in the first support vector machine, $x_N$ represents new support vectors used in the new support vector machine, $\alpha_O$ represents current support vector weights used in the first support vector machine and $\alpha_N$ represents new support vector weights used in the new support vector machine.

16. The system of claim 10, wherein the classification is a one-class classification.

17. The system of claim 10, wherein the classification is a multi-class classification by
modifying a constraint for determining a new vector machine from $$\sum_{i=1}^{N} \alpha_i = 1 \text{ to } \sum_{i=1}^{N} \alpha_1 = 0.$$

18. The system of claim 10, further comprising:
repeating by the processor the steps of claim 10 until an optimum is reached.

* * * * *